United States Patent
Vinogradov et al.

(10) Patent No.: US 8,752,767 B2
(45) Date of Patent: Jun. 17, 2014

(54) ILLUMINATION SYSTEM WITH PRISM FOR USE IN IMAGING SCANNER

(75) Inventors: Igor Vinogradov, Oakdale, NY (US); David T. Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 168 days.

(21) Appl. No.: 13/526,913

(22) Filed: Jun. 19, 2012

(65) Prior Publication Data

US 2013/0334315 A1 Dec. 19, 2013

(51) Int. Cl.
*G02B 26/00* (2006.01)

(52) U.S. Cl.
USPC .................................................. 235/462.35

(58) Field of Classification Search
CPC .......... G06K 7/10732; G06K 7/10712; G06K 7/10861
USPC ............................ 235/462.35, 462.41, 462.42
See application file for complete search history.

(56) References Cited

U.S. PATENT DOCUMENTS

| | | | |
|---|---|---|---|
| 5,697,699 A | | 12/1997 | Seo et al. |
| 5,818,637 A | * | 10/1998 | Hoover et al. ............... 359/381 |

OTHER PUBLICATIONS

International Search Report and Written Opinion in counterpart patent application PCT/US2013/041325 mailed Aug. 30, 2013.

* cited by examiner

*Primary Examiner* — Jamara Franklin

(57) ABSTRACT

An apparatus includes an illumination lens, an illumination light source for generating illumination light, and a prism made of optical transparent material. The first section on the first surface of the prism has a length that is at least four times as long as its width. The first surface of the prism includes a second section adjacent to the first section for defining the edge of an aperture. The third surface of the prism is configured to reflect the illumination light received from the first section onto the second surface of the prism. At least a portion of the illumination light received from the first section passes through both the second surface of the prism and the illumination lens for projecting illumination light onto a target object within an imaging field of view.

22 Claims, 9 Drawing Sheets

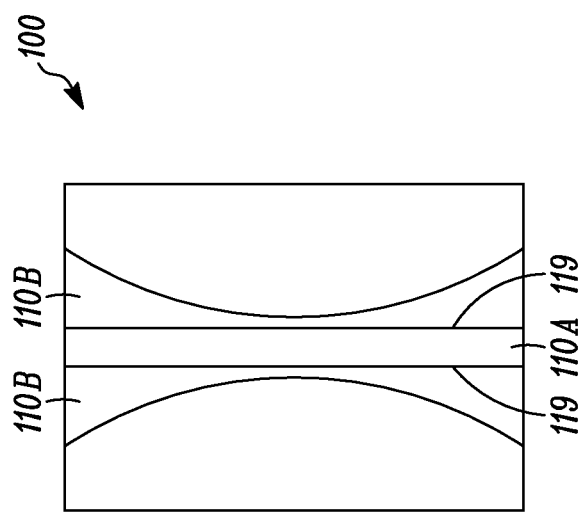

ILLUMINATION SYSTEM WITH PRISM FOR USE IN IMAGING SCANNER

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

SUMMARY

In one aspect, the invention is directed to an apparatus. The apparatus includes an illumination lens, an illumination light source for generating illumination light, and a prism made of optical transparent material. The prism includes a first surface having a first section thereon facing the illumination light source to allow the illumination light received from the illumination light source to pass through, a second surface facing the illumination lens, and a third surface facing both the first surface and the second surface. The first section on the first surface has a length thereof at least four times as long as a width thereof, and the first surface includes a second section adjacent to the first section for defining the edge of an aperture. The third surface of the prism is configured to reflect the illumination light received from the first section onto the second surface to redirect at least a portion of the illumination light received from the first section to pass through both the second surface of the prism and the illumination lens for projecting the portion of the illumination light onto the target object within the imaging field of view. The third surface of the prism is also configured to substantially prevent the additional light received from the second section of the first surface from being projected onto the target object within the imaging field of view though the illumination lens.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 5A-5B depict the prism in some details in accordance with some embodiments.

Figure 1:
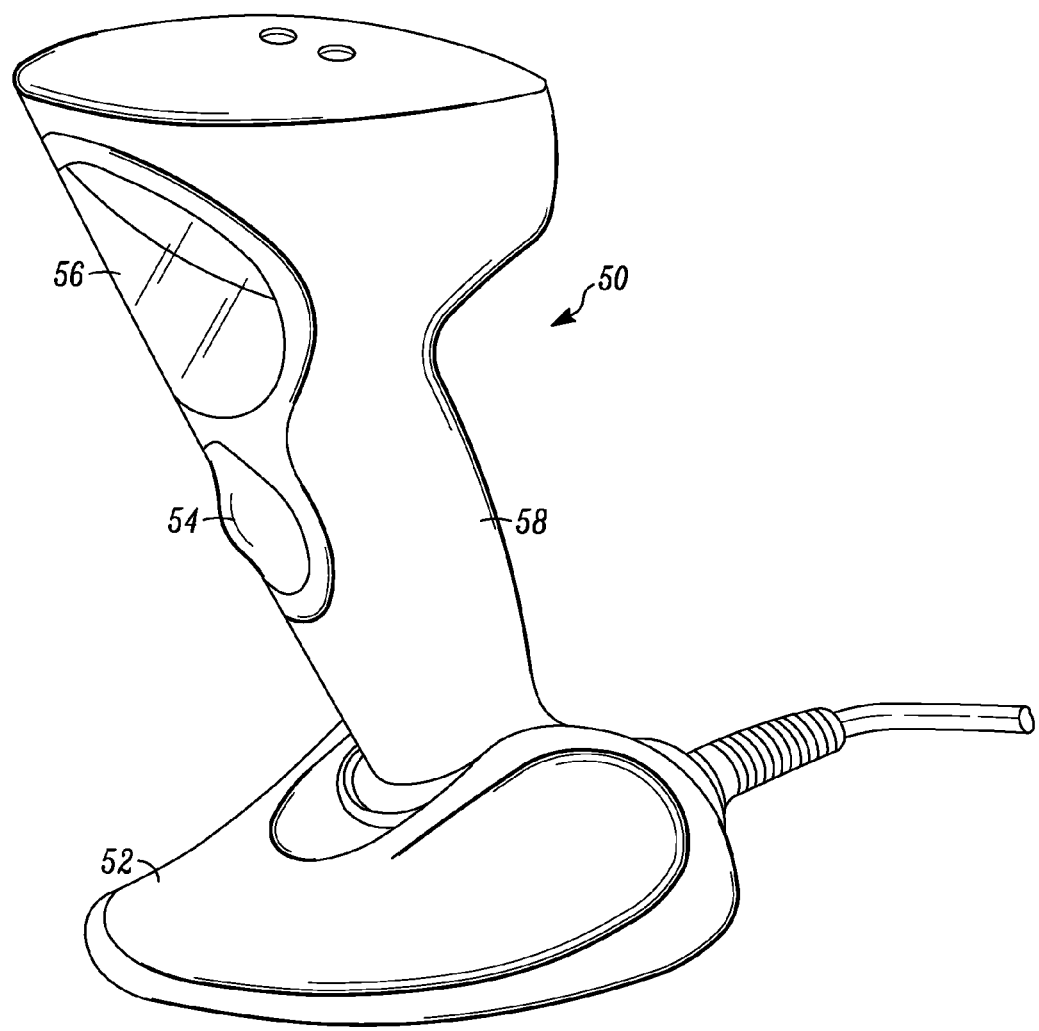
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
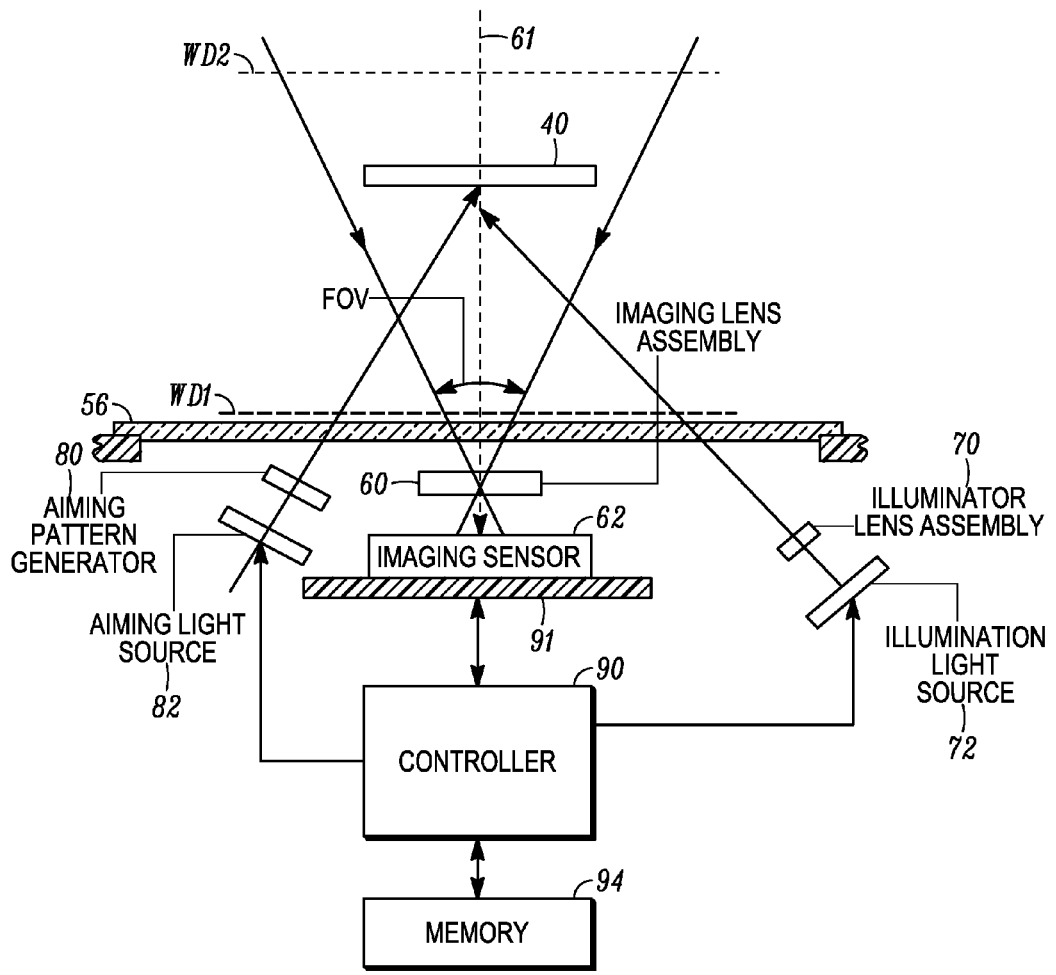
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination light source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as image data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination light source 72 are designed to operate together for generating an illuminating light towards the barcode 40 during an illumination time period. The illumination light source 72 can include one or more light emitting diodes (LED). The illumination light source 72 can also include a laser or other kind of light sources. The aiming pattern generator 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination light source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination light source 72 for a predetermined illumination time period. The controller 90 then exposes the imaging sensor 62 to capture an image of the barcode 40. The captured image of the barcode 40 is transferred to the controller 90 as image data. Such image data is digitally processed by the decoder in the controller 90 to decode the barcode. The information obtained from decoding the barcode 40 is then stored in the memory 94 or sent to other devices for further processing.

Figure 3:
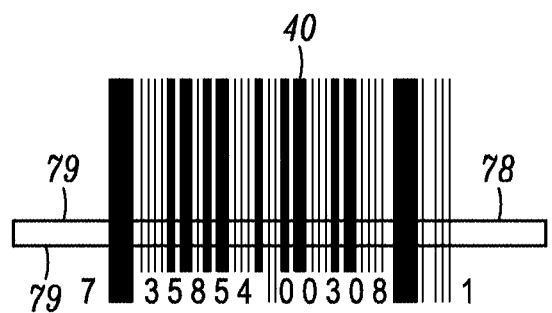
FIG. 3 shows an illumination system that generates an illumination light with a corresponding illumination FOV towards a barcode.

Linear imager requires an illumination system for reading indicia under low ambient light conditions. As shown in FIG. 3, the illumination system can generate an illumination light with a corresponding illumination FOV 78 towards a barcode 40 within imaging FOV. The second purpose of the illumination system is to guide the user to where the actual imaging FOV is located. It is highly desirable to have a high efficiency illumination system with high brightness to provide a good reader performance under a low ambient light condition and to generate a well visible sharp aiming line as the illumination FOV 78.

A fold mirror between the light source 72 and the illumination lens 70 can be used for folding the optical path of the illumination FOV 78 to accommodate a more compact design. However the light coupling efficiency of this system is quite low since the cone angle of the emitted light of the light source 72 may not match well to the size of the illumination lens 70. A fold mirror may have an additional optical power which may improve somewhat the coupling efficiency. However this design does not allow implementing an optical aperture which provides good consistency of the illuminating line sharpness in mass production environment. As an additional drawback of the fold mirror design is that it requires a reflective coating on the mirror surface which adds additional cost to the product.

An improved illumination system can include a coupling optical prism positioned between the light source and the illumination lens. The coupling prism can have an optical aperture which further improves the sharpness and consistency of the illuminating line. This coupling optical prism includes some modified surfaces to provide desired illumination beam shaping properties from the light source. Usually a coupling efficiency between a light source such as LED and the illumination lens is quite low. In particular this is the case for small size linear imaging engines where the space is limited and optical means are necessary to fold the optical path into a provided volume. Usually the cone of light from the light source does not intercept properly the illumination lens. By having a prism with surfaces of non-zero optical power the light cone of the light source can be optically modified to match efficiently with the illumination lens and by these means to improve light throughput through the system. This improved illumination system can have the coupling efficiency that is at least about two times better than some of the existing systems with a flat fold mirror.

Figure 4:
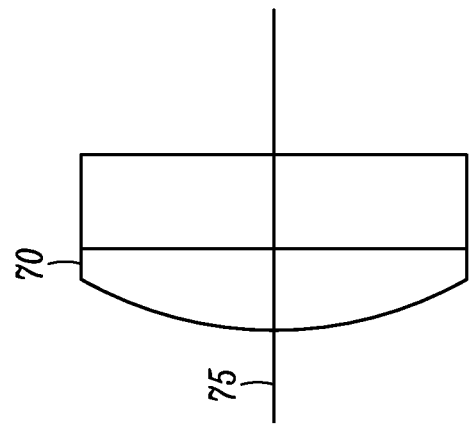
FIG. 4 is a schematic of an illumination system that has a coupling optical prism positioned between the light source and the illumination lens in accordance with some embodiments.
Figure 4:
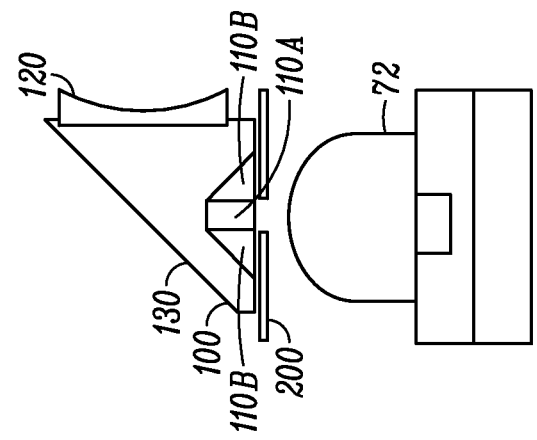

FIG. 4 is a schematic of an illumination system that has a coupling optical prism positioned between the light source and the illumination lens in accordance with some embodiments. In FIG. 4, the illumination system includes an illumination lens 70, an illumination light source 72, and a prism 100. The prism 100 can be made out of optical transparent material such as polycarbonate, zeonex, and others. The prism can be molded out of plastic or manufactured by other means.

Figure 5A:
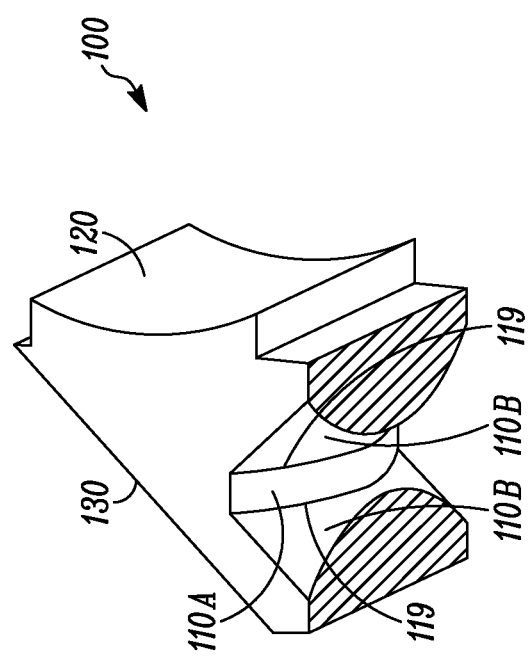

FIGS. 5A-5B depict the prism 100 in some details in accordance with some embodiments. FIG. 5B is a bottom view of the prism 100. As shown in FIG. 4 and FIGS. 5A-5B, the prism 100 includes a first surface having a first section 110A and a second section 110B, a second surface 120 facing the illumination lens 70, and a third surface 130 facing both the first surface (i.e. the first section 110A and the second section 110B) and the second surface 120. The third surface 130 is located between the first surface and the second surface when light travels the optical path from the first to the second surfaces.

In FIG. 4, the first section 110A on the first surface is generally facing the illumination light source 72 to allow the illumination light received from the illumination light source 72 to pass through. As shown in FIGS. 5A-5B, the second section 110B on the first surface is adjacent to the first section 110A for defining the edge 119 of an aperture. In a preferred embodiment the edge 119 is a line. The first section 110A is substantially elongated along one axis, and it generally has a length that is at least four times as long as its width. The aperture length (as defined generally by the length of the first section 110A) can be selected as per design requirements to control the horizontal length of the illuminating line. In one specific implementation, the aperture (as defined by the first section 110A and the second section 110B) has a rectangular shape. In some embodiments, the first section 110A has a curvature. In one implantation as shown FIGS. 5A-5B, the first section 110A is cylindrical along the aperture edge and has a positive cylindrical power. In another embodiment this surface can be toroidal or any other free form. Also in another embodiment the section 110A can comprise the entire first surface with no section 110B and no optical aperture 119.

Figure 6:
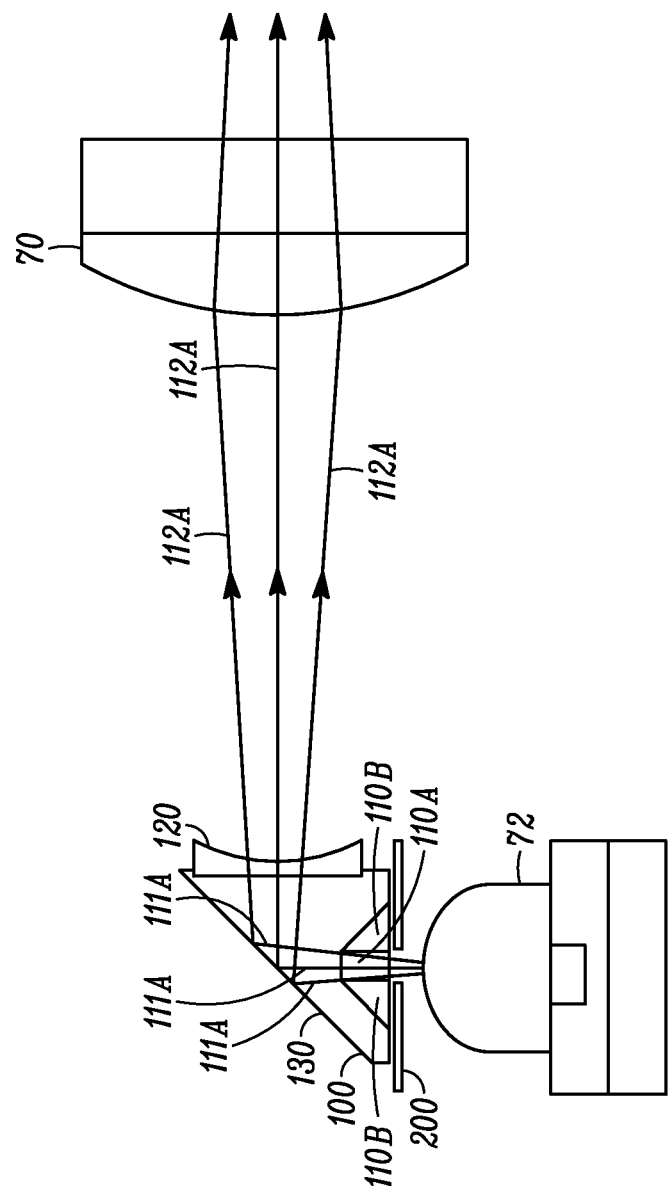
FIG. 6 depicts that the third surface of the prism is configured to reflect the illumination light received from the first section of the first surface onto the second surface in accordance some embodiments.

FIG. 6 depicts that the third surface 130 of the prism 100 is configured to reflect the illumination light 111A received from the first section 110A onto the second surface 120 as light 112A in accordance some embodiments. In such configuration, at least a portion of the illumination light received from the first section 110A passes through both the second surface 120 of the prism 100 and the illumination lens 70 for projecting the portion of the illumination light onto the target object within the imaging field of view. In FIG. 6, the third surface 130 of the prism 100 folds the light at approximately 90 degrees. The light of the main optical path 112A impinges on this third surface 130 at approximately 45 degrees and due to TIR (total internal reflection) gets reflected by this surface along the main optical path towards the illumination lens 70. In some embodiments, this third surface 130 is uncoated. In some embodiments, this third surface 130 can have a curvature to it. In some other embodiments, a coating maybe applied the surface 130 if the incident angle is smaller than angle required for TIR to occur.

Figure 7A:
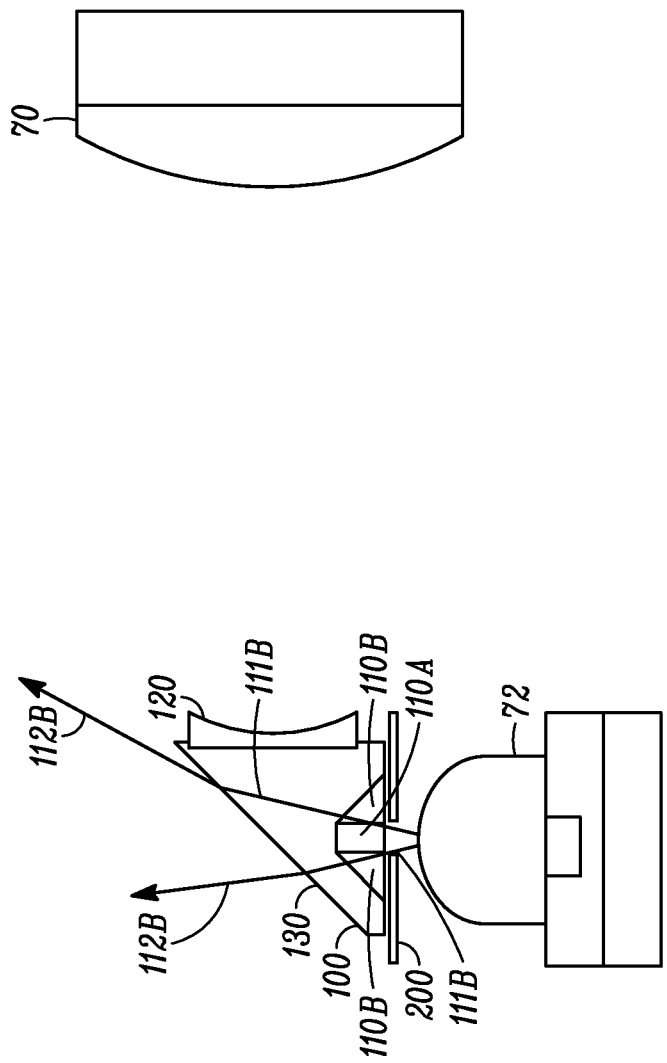
FIGS. 7A-7B depict that the third surface of the prism is configured to substantially prevent the additional light received from the second section from being projected onto the target object within the imaging field of view though the illumination lens.
Figure 7B:
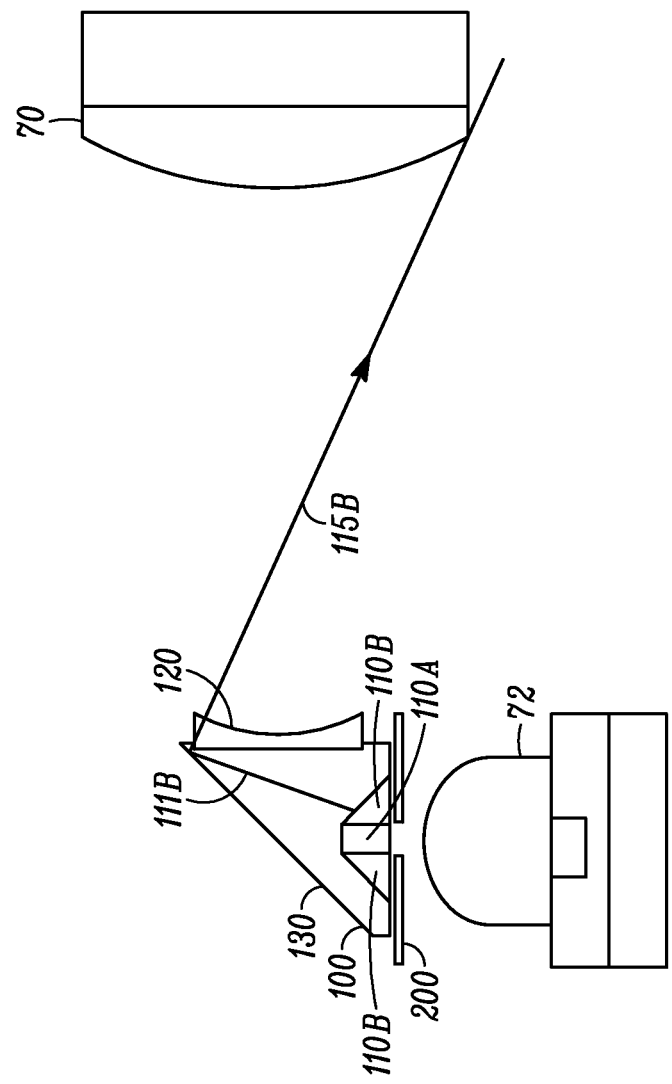

FIGS. 7A-7B depict that the third surface 130 of the prism 100 is also configured to substantially prevent the additional light 111B received from the second section 110B from being projected onto the target object within the imaging field of view though the illumination lens 70. The light 112B is substantially redirected from the main optical path 112A and is not projected by the lens 70 onto the target. In FIG. 7A, the third surface 130 of the prism 100 is configured to cause the light 111B received from the second section 110B of the first surface to transmit out of the prism through the third surface 130 as light 112B. In FIG. 7B, the third surface 130 of the prism 100 is configured to cause the light 111B received from the second section 110B of the first surface to be deflected outside the main optical pass 112A as light 112B and 115B that does not reaches the illumination lens 70. In some implementations, the deflected light 115B can be blocked with an additional aperture stop to substantially prevent light 115B from reaching the illumination lens 70. In some implementations, an additional aperture stop can be used to substantially prevent light 115B from projecting onto the target object within the imaging field of view though the illumination lens 70.

In FIG. 6, the illumination lens 70 projects the image of an aperture as formed by the first section 110A outwards and forms preferably a sharp image 78 of the aperture (i.e., first section 110A) at a certain distance on the target object of interest as shown in FIG. 3, in which the sharp image 78 can be well defined by the sharp edges 79. In some embodiments, the second surface 120 of the prism 100 has an optical power that is differ from zero diopter at least in one direction. In some embodiments, the second surface 120 can be toroidal where optical power is different in mutually perpendicular directions. In some embodiments, the second surface 120 can have no optical power in one direction, as in the case of a cylindrical surface. Also, for example, an astigmatic and toroidal surface may have zero total power but very strong power in X and Y direction with opposite signs. In some embodiments, the second surface 120 is cylindrical where the cylindrical axis is substantially aligned with the aperture longer direction 119 formed by the first section 110A. This second surface 120 reduces effective size of the aperture formed by the first section 110A when it is imaged by the illumination lens 70; therefore, the vertical size of this physical aperture (i.e., the width of the first section 110A) has to be increased to maintain the same effective size and by these means increases the light throughput through its physical aperture 110A and the overall system.

In some embodiments, as shown in FIG. 4, there is another opaque aperture 200 located between the light source 72 and the first section 110A of the first surface on the prism. The opaque aperture 200 blocks the major part of the unused light which may come from the light source 72 and cause unwanted stray light and perceived quality of the illumination line 78. Aperture 200 trims the majority of light from the light source 72 but does not interfere with the main optical path. The width of the aperture 200 is wider than the width of the first section 110A. In such embodiment, It is the first section 110A that is actually imaged outwards by the illumination lens 70. Aperture 200 is used as a light baffle to reduce scattered light which may occur in the system. In some implementations, the length of the aperture 200 can be shorter than the length of the first section 110A. In another embodiment, there may not be an aperture formed by the first section 110A, and the illumination line is shaped by the aperture 200 only. Aperture 200 can made out of sheet metal by stamping or etching process or the aperture can be formed as part of the opaque chassis. The illumination lens 70 can be of any shape (free shape or symmetrical) and it depends on requirements of a particular design.

The illumination system as shown in FIG. 4 can improve the coupling efficiency of the light source and the illumination lens and allows to maintain overall small physical volume of the illumination system. This illumination system be used in a small size linear imagers and imaging engines where high efficiency and high illumination line brightness is required.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    an illumination lens;
    an illumination light source for generating illumination light;
    an imaging lens arrangement;
    an imaging sensor having photosensitive elements configured to detect light from a target object within an imaging field of view through the imaging lens arrangement during a time period when the illumination light is generated by the illumination source, wherein the imaging sensor is configured to output image data from the photosensitive elements;
    a prism made of optical transparent material for the illumination light, the prism comprising a first surface having a first section thereon facing the illumination light source to allow the illumination light received from the illumination light source to pass through, a second surface facing the illumination lens, and a third surface facing both the first surface and the second surface;
    wherein the first section on the first surface has a length thereof at least four times as long as a width thereof, and wherein the first surface includes a second section adjacent to the first section for defining the edge of an aperture; and
    wherein the third surface of the prism is configured to reflect the illumination light received from the first section onto the second surface to redirect at least a portion of the illumination light received from the first section to pass through both the second surface of the prism and the illumination lens for projecting the portion of the illumination light onto the target object within the imaging field of view, and the third surface of the prism is also configured to substantially prevent the additional light received from the second section from being projected onto the target object within the imaging field of view though the illumination lens.

2. The apparatus of claim 1, further comprising a controller configured for processing the image data to decode an image of a barcode on the target object.

3. The apparatus of claim 1, wherein the third surface of the prism is configured to reflect substantially all of the illumination light received from the first section onto the second surface of the prism.

4. The apparatus of claim 1, wherein the third surface of the prism is configured to substantially prevent the additional light received from the second section from impinging upon the illumination lens.

5. The apparatus of claim 1, wherein the third surface of the prism is configured to cause at least a portion of the additional light received from the second section to transmit out of the prism through the third surface.

6. The apparatus of claim 1, wherein the second surface of the prism has an optical power that is differ from zero diopter at least in one direction.

7. The apparatus of claim 1, wherein the second surface of the prism comprises a cylindrical surface having a cylindrical axis substantially aligned with the longer dimension of the first section on the first surface of the prism.

8. The apparatus of claim 1, wherein the first section on the first surface of the prism has a curvature.

9. The apparatus of claim 1, wherein the first section on the first surface of the prism comprises a cylindrical surface and has an optical power that is differ from zero.

10. The apparatus of claim 9, wherein the optical power is optimized to match the cone angle from the illumination light source with the width of the illumination lens.

11. The apparatus of claim 1, further comprising an opaque aperture positioned between the first surface of the prism and the illumination source, wherein the opaque aperture has the length thereof significantly larger than the width thereof, and wherein the longer dimension of the opaque aperture is aligned with the longer dimension of the first section on the first surface of the prism.

12. The apparatus of claim 11, wherein the width of the opaque aperture is larger than the width of the first section on the first surface of the prism.

13. The apparatus of claim 11, wherein the width of the opaque aperture is smaller than the width of the first section on the first surface of the prism.

14. The apparatus of claim 11, wherein the length of the opaque aperture is smaller than the length of the first section on the first surface of the prism.

15. The apparatus of claim 1, wherein the third surface of the prism is tilted with an approximately 45 degrees angle relative to an optical axis that passes through the center of the illumination lens.

16. The apparatus of claim 1, wherein the third surface of the prism is configured to reflect substantially all of the illumination light received from the first section onto the second surface of the prism by total internal reflection (TIR).

17. The apparatus of claim 1, wherein the third surface of the prism includes a surface-section coated with reflective materials to form a mirror surface without relying upon total internal reflection in cases when the incident angle of light rays from the light source on the third surface is smaller than the critical angle required for TIR.

18. An apparatus comprising:
an illumination lens;
an illumination light source for generating illumination light;
an imaging lens arrangement;
an imaging sensor having photosensitive elements configured to detect light reflected from a target object within an imaging field of view through the imaging lens arrangement during a time period when the illumination light is generated by the illumination source, wherein the imaging sensor is configured to output image data from the photosensitive elements;
a prism made of optical transparent material, the prism comprising a first surface facing the illumination light source to allow the illumination light received from the illumination light source to pass through, a second surface facing the illumination lens, and a third surface facing both the first surface and the second surface;
a physical aperture positioned between the illumination light source and the prism; and
wherein the third surface of the prism is configured to reflect the illumination light from the physical aperture onto the second surface to redirect the illumination light received from the physical aperture to pass through both the second surface of the prism and the illumination lens for generating an image of the physical aperture onto the target within the imaging field of view.

19. A method comprising:
projecting illumination light from an illumination light source onto a first surface of a prism that is made of optical transparent material, wherein the first surface includes a first section having a length thereof at least four times as long as a width thereof, and the first surface includes a second section adjacent to the first section for defining the edge of an aperture;
reflecting the illumination light received from the first section onto a second surface of the prism, by a third surface of the prism, to redirect at least a portion of the illumination light received from the first section to pass through both the second surface of the prism and an illumination lens for projecting the portion of the illumination light onto a target object within an imaging field of view, while substantially preventing additional light received from the second section from being projected onto the target object within the imaging field of view though the illumination lens;
detecting light from the target object within the imaging field of view through an imaging lens arrangement with an imaging sensor having photosensitive elements during a time period when the illumination light is generated by the illumination source, wherein the imaging sensor is configured to output image data from the photosensitive elements; and
processing and decoding the image data sampling an image of a barcode of the target object projected on the imaging sensor.

20. The method of claim 19, wherein said reflecting the illumination light received from the first section comprises:
reflecting substantially all of the illumination light received from the first section onto the second surface of the prism.

21. The method of claim 19, wherein said reflecting the illumination light received from the first section comprises:
reflecting the illumination light received from the first section onto the second surface of the prism, by the third surface of the prism, to redirect at least a portion of the illumination light received from the first section to pass through both the second surface of the prism and the illumination lens for projecting the portion of the illumination light onto the target object within the imaging field of view, while substantially preventing additional light received from the second section from impinging upon the illumination lens.

22. The method of claim 21, wherein said substantially preventing additional light received from the second section from impinging upon the illumination lens comprises:
causing at least a portion of the additional light received by the third surface of the prism from the second section to transmit substantially out of the prism through the third surface.

* * * * *